(12) United States Patent
Kamrat

(10) Patent No.: US 9,063,020 B2
(45) Date of Patent: Jun. 23, 2015

(54) METHOD AND DEVICE FOR MEASURING TEMPERATURE HAVING A SEPARATE STRUCTURE FOR TERMINAL AREAS ARRANGED IN UNRESTRICTED THERMAL CONTACT WITH A PROCESS LIQUID

(75) Inventor: Esko Kamrat, Vantaa (FI)

(73) Assignee: JANESKO OY, Vantaa (FI)

( * ) Notice: Subject to any disclaimer, the term of this patent is extended or adjusted under 35 U.S.C. 154(b) by 132 days.

(21) Appl. No.: 13/273,907

(22) Filed: Oct. 14, 2011

(65) Prior Publication Data

US 2012/0093192 A1    Apr. 19, 2012

(30) Foreign Application Priority Data

Oct. 14, 2010   (FI) ..................................... 20106065

(51) Int. Cl.
*G01K 1/00* (2006.01)
*G01K 1/16* (2006.01)
*G01K 13/02* (2006.01)

(52) U.S. Cl.
CPC . *G01K 1/16* (2013.01); *G01K 13/02* (2013.01)

(58) Field of Classification Search
CPC ................................. G01K 1/16; G01K 13/02
USPC ......... 374/163, 183, 185, 208, 141, 147, 139, 374/137; 338/22 R, 25, 28; 702/130
See application file for complete search history.

(56) References Cited

U.S. PATENT DOCUMENTS

| | | | |
|---|---|---|---|
| 3,845,661 A | | 11/1974 | Hollweck et al. |
| 4,129,848 A | * | 12/1978 | Frank et al. .................... 338/308 |
| 4,215,577 A | | 8/1980 | Griffing et al. |
| 4,243,968 A | | 1/1981 | Scott |
| 4,516,106 A | | 5/1985 | Nolting et al. |
| 4,791,398 A | * | 12/1988 | Sittler et al. ..................... 338/25 |
| 5,141,334 A | * | 8/1992 | Castles .......................... 374/178 |
| 6,127,915 A | | 10/2000 | Gam et al. |
| 6,354,736 B1 | * | 3/2002 | Cole et al. ...................... 374/185 |
| 7,201,513 B2 | | 4/2007 | Nakabayashi |
| 2002/0172259 A1 | | 11/2002 | Bach |

(Continued)

FOREIGN PATENT DOCUMENTS

| | | |
|---|---|---|
| DE | 199 05 384 A1 | 8/2000 |
| EP | 0 036 957 A2 | 10/1981 |

(Continued)

OTHER PUBLICATIONS

Finnish Search Report for FI 20106065 dated May 27, 2011.

(Continued)

*Primary Examiner* — Lisa Caputo
*Assistant Examiner* — Janice M Soto
(74) *Attorney, Agent, or Firm* — Buchanan Ingersoll & Rooney PC

(57) ABSTRACT

A method and measuring sensor are disclosed for measuring temperature, the method including arranging a measuring element of the sensor into thermal contact with a process liquid being measured, and directing a measuring signal received from the measuring element onward by measuring conductors connected to the measuring element. Close to the measuring element, terminal areas are established which are arranged in unrestricted thermal contact with the process liquid being measured, and the measuring conductors are connected to the measuring element through the terminal areas.

20 Claims, 6 Drawing Sheets

(56) References Cited

U.S. PATENT DOCUMENTS

| | | |
|---|---|---|
| 2004/0037347 A1 | 2/2004 | Brown et al. |
| 2005/0213949 A1 | 9/2005 | Koren et al. |
| 2008/0025372 A1* | 1/2008 | Culbertson et al. ............ 374/185 |
| 2009/0066353 A1* | 3/2009 | Devey et al. .................. 324/757 |
| 2009/0110024 A1 | 4/2009 | Kamei et al. |
| 2010/0202490 A1* | 8/2010 | Ishikawa et al. .............. 374/165 |

FOREIGN PATENT DOCUMENTS

| | | |
|---|---|---|
| GB | 1440393 A | 6/1976 |
| WO | 86/01027 A1 | 2/1986 |

OTHER PUBLICATIONS

Office Action issued on Nov. 15, 2012 by the USPTO in corresponding U.S. App. No. 13/274,000.
Office Action issued by the U.S. Patent and Trademark Office in the U.S. Appl. No. 13/274,000, mailed Aug. 30, 2013, U.S. Patent and Trademark Office, Alexandria, VA. (14 pages).
Office Action dated Sep. 26, 2014 issued by the U.S. Patent and Trademark Office in corresponding U.S. Appl. No. 13/274,000.
Office Action mailed May 16, 2013 issued by the USPTO in corresponding U.S. Appl. No. 13/274,000.
Search Report issued Jun. 1, 2011 by Finnish Patent Office in corresponding Finnish Patent Application No. 20106066.

* cited by examiner

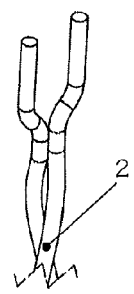
Fig. 1
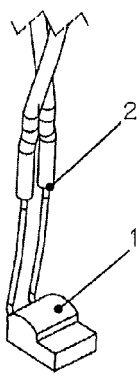
Fig. 2
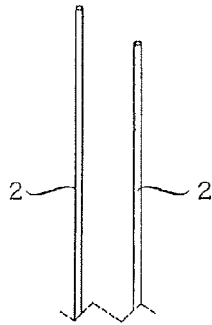
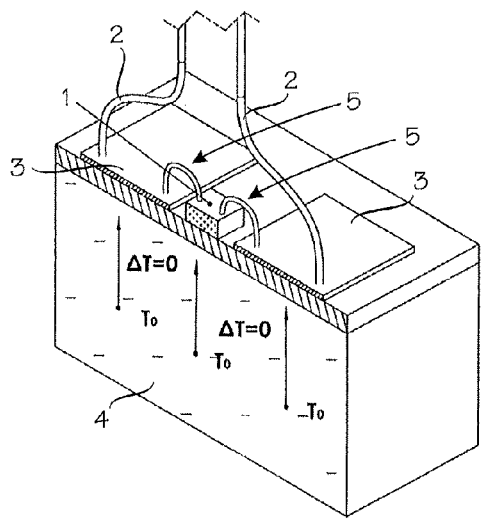

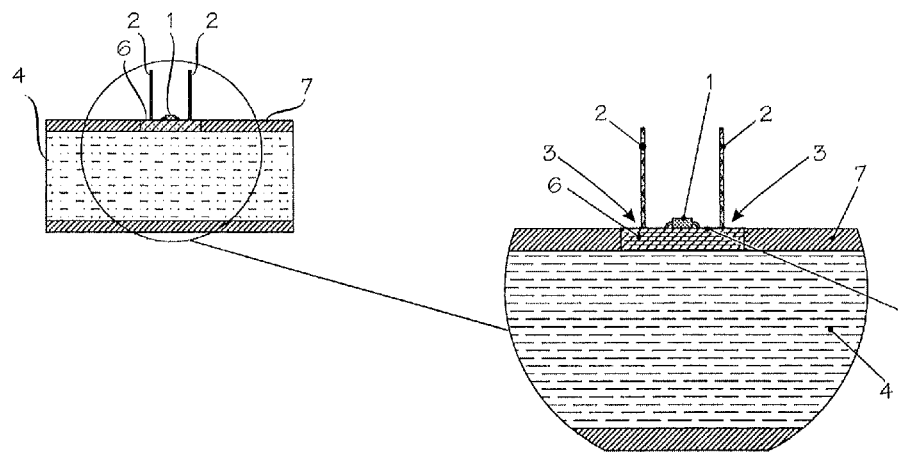
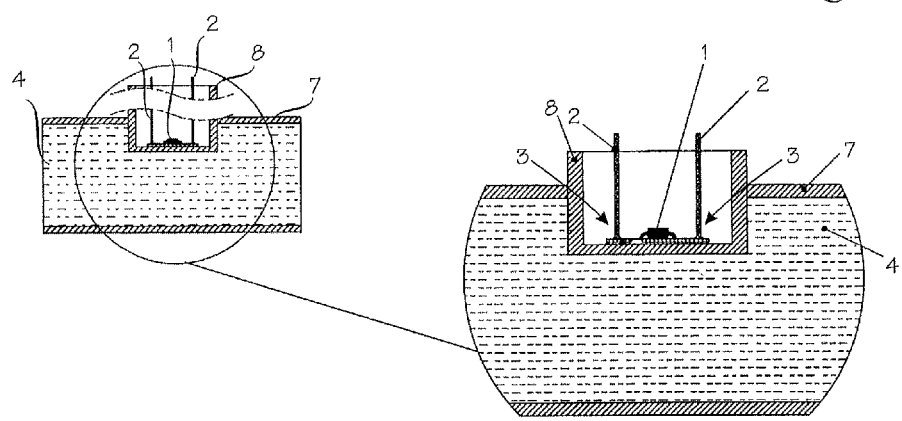

METHOD AND DEVICE FOR MEASURING TEMPERATURE HAVING A SEPARATE STRUCTURE FOR TERMINAL AREAS ARRANGED IN UNRESTRICTED THERMAL CONTACT WITH A PROCESS LIQUID

RELATED APPLICATIONS

This application claims priority under 35 U.S.C. §119 to Finish Patent Application No. 20106065 filed in Finland on Oct. 14, 2010, the entire content of which is hereby incorporated by reference in its entirety.

FIELD

The invention relates to a method for measuring temperature, the method comprising arranging a measuring element of a measuring sensor into thermal contact with a process being measured and directing a measuring signal received from the measuring element onward by means of measuring conductors connected to the measuring element. The invention also relates to a measuring sensor for measuring temperature.

BACKGROUND INFORMATION

Semiconductor, thermocouple, or resistor sensors in chip form, for instance, are used for precise measurement of temperature in process industry.

Sensor technology used in the prior art is often based on thick-film technology, wherein an active element is made by metallizing the element on the surface of a ceramic plate chemically, by evaporation or sputtering.

In the prior-art solutions, between the surface being measured and the measuring element, there is, thus, ceramic material that is usually dimensioned in the range of 2.5×2.0 mm with a thickness of approximately 0.7 mm. Measuring conductors with a typical diameter of approximately 0.2 mm are connected to the measuring element.

A problem with the prior-art solutions is conducting heat at an as small temperature difference as possible to the measuring element through an aluminum oxide layer. Another problem with the prior-art solutions is heat conduction away from the measuring element through connection conductors, the prevention of which is problematic. The connection conductors need to be relatively thick in comparison with the surface area of the chip. The diameter of the connection conductors cannot be reduced very much due to connectivity in practice. If the diameter of the connection conductors is reduced too much, conductor resistance at the measuring element begins to increase in a disturbing manner.

Solutions in which sensors are manufactured in the form of chip resistors are also known in the prior art. In solutions of this type, solder terminals are metallized at the ends of a ceramic chip to transfer the measuring signal onward.

In both above-mentioned prior-art constructions, heat loss at the measuring element causes a significant measuring error, when the temperature difference increases between the temperatures of the process being measured and the environment.

SUMMARY

The purpose of the invention is to provide a method and measuring sensor with which the prior-art disadvantages can be eliminated. This is achieved by a method and measuring sensor of the invention. The method of the invention is characterized by arranging, close to the measuring element, means for establishing terminal areas which are arranged into unrestricted thermal contact with the process being measured, and by connecting measuring conductors to the measuring element through the terminal areas. The measuring sensor of the invention is, in turn, characterized in that the sensor comprises means which are arranged to establish terminal areas close to the measuring element, the terminal areas being intended to be unrestricted thermal contact with the process being measured during measurement, and that measuring conductors are connected to the measuring element through the terminal areas.

The invention provides the advantage that it establishes conditions in which the temperature of the terminal areas is the same as the temperature being measured, in which case no temperature gradient is created. When using the solution of the invention, measuring accuracy also improves considerably in comparison with the prior-art solutions. The effect on reaction time is also significant in comparison with the prior art.

BRIEF DESCRIPTION OF THE DRAWINGS

The invention will be explained in the following in more detail by means of working examples described in the attached drawing, in which FIG. 1 is an example of a prior-art solution, FIG. 2 shows the basic principle of the solution of the invention, FIG. 3 shows a first embodiment of the solution of the invention, FIG. 4 shows a second embodiment of the solution of the invention.

DETAILED DESCRIPTION

Figure 5:
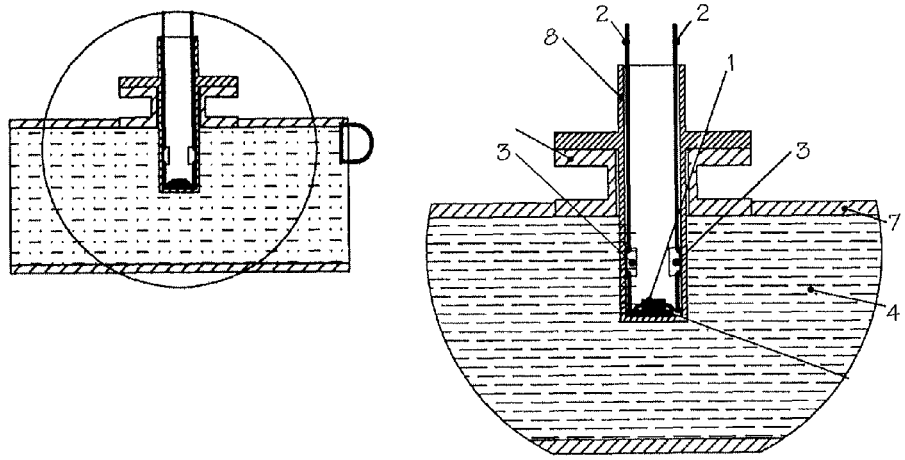
FIG. 5 shows a third embodiment of the solution of the invention.

FIG. 1 shows a typical sensor solution of the prior art. Reference number 1 denotes a measuring element. The measuring element may be any element known per se, such as a Pt1000 resistor element.

Reference number 2 denotes measuring conductors.

For a person skilled in the art, the solution of FIG. 1 and its operation is fully conventional technology, wherefore they are not explained in greater detail herein.

The example solution of FIG. 1 representing the prior art has all the disadvantages referred to in the above text relating to the prior art.

FIG. 2 shows the basic principle of the solution of the invention. The same reference numbers are used in FIG. 2 as in FIG. 1 to refer to the corresponding parts.

According to the basic idea of the invention, means 3 are arranged close to the measuring element 1. With the means 3, terminal areas are established to be in unrestricted thermal contact with the process 4 being measured. Measuring conductors 2 are connected to the measuring element 1 through the terminal areas. The connection between the terminal areas and measuring element 1 is shown in general in FIG. 2 by means of reference number 5.

In the solution of the invention, conditions are created, wherein terminal areas are established close to the measuring element 1 by using the means 3. The surface areas of the terminal areas established by the means 3 are larger than the surface area of the measuring element that is in thermal contact with the process 4 being measured. There is no temperature difference between the measuring element 1 and terminal areas, which means that a harmful temperature gradient cannot be created.

By means of the above-mentioned solution, it is also possible to provide, in terms of measuring precision and reaction time, a better solution than the solutions of the prior art.

FIG. 3 shows a first embodiment of the solution of the invention. Like parts are denoted with like reference numerals in FIGS. 2 and 3.

In the embodiment of FIG. 3, the measuring element 1 and the means 3 establishing the terminal areas are arranged on the surface of a window 6 to be arranged in contact with the process 4. Reference number 7 denotes a process pipe.

The embodiment of FIG. 3 is intended for measuring aggressive chemicals, for example. The measuring element 1 and means 3 that establish the terminal areas are arranged on the surface of the window according to the principle shown in FIG. 2. The window may be made of mineral or plastic material, for instance. An example of suitable materials is sapphire. This type of solution provides the advantage that with the solution, it is possible to measure temperatures from the process precisely and quickly without metal parts.

In connection with the above solution, it is also possible to use a film made of special metal. Examples of special metals are gold and platinum.

The means 3 that establish the terminal areas may be glued or metallized, for instance, to the surface of the window 6. It is also possible to use "flex conductors" or corresponding components. The measuring element may be connected to the terminal areas established in the above-mentioned manners by using lines, surface mounting, or bonding.

The measuring sensor of the invention may also be implemented in such a manner that the measuring element is arranged inside a framework 8 arranged to extend to the process 4. FIGS. 4 and 5 show embodiments of this type.

In the embodiments of FIGS. 4 and 5, the measuring element 1 and means 3 establishing the terminal areas are arranged at the bottom of the framework 8.

In the embodiments of FIGS. 4 and 5, the framework is made of a heat-conductive and electrically non-conductive material. The terminal areas and the mounting area of the measuring element are metallized. The bottom of the measuring element 1 is also metallized, and the measuring element is fastened to its base by soldering, for instance. Connecting the measuring element may be done in the same manner as shown above in connection with FIG. 3.

Flex conductors can also be used as the means 3 with which the terminal areas are established. In this type of embodiment, the measuring element 1 is mounted inside a probe-like pipe, for instance. The terminal areas and measuring conductors are implemented by a flex conductor that is brought to thermal contact with the inner surface of the heat-conductive probe pipe. The structure may also be implemented in such a manner that a sensor is provided having a massive part, into which the measuring element 1 is embedded. The structure further has a sleeve-like part, into which bonding areas formed by means of a flex conductor are arranged.

Figure 6:
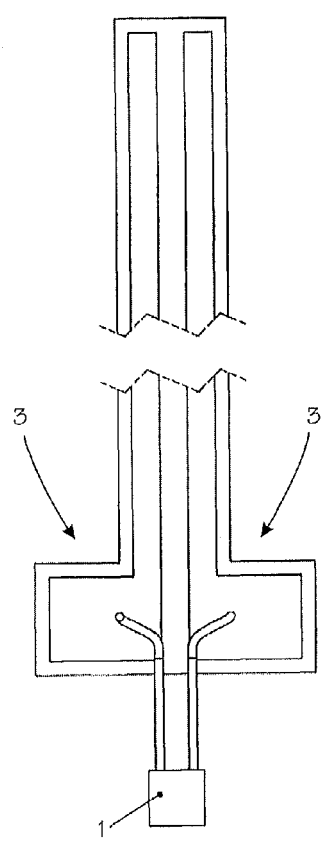
FIG. 6 shows a fourth embodiment of the solution of the invention.
Figure 7:
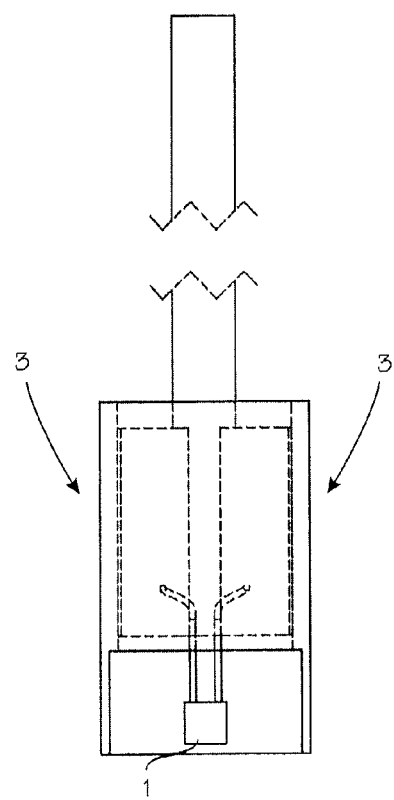
FIGS. 7 and 8 show a fifth embodiment of the solution of the invention in general and in perspective.
Figure 8:
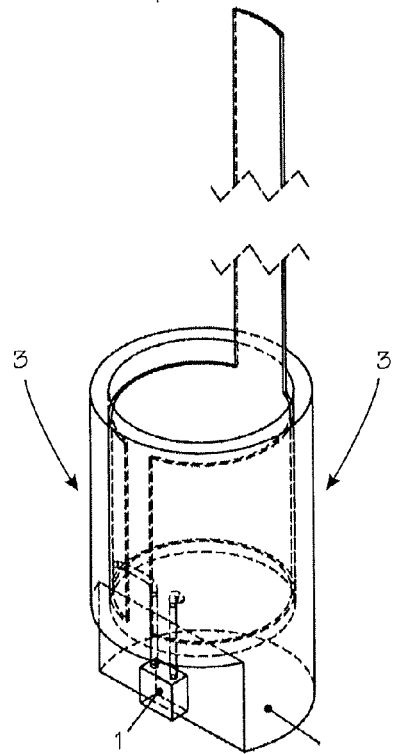

The embodiment described above is shown in FIGS. 6, 7, and 8. FIG. 6 shows the basic principle and FIGS. 7 and 8 show a working example. The same reference numerals are used in FIGS. 6 to 8 as in the examples of FIGS. 2 to 5 to refer to the corresponding parts.

Figure 9:
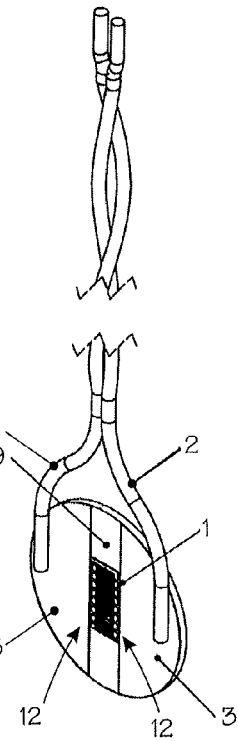
FIG. 9 shows a sixth embodiment of the solution of the invention.
Figure 10:
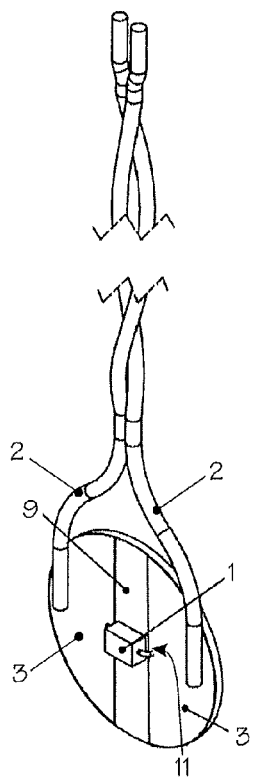
FIG. 10 shows a seventh embodiment of the solution of the invention.
Figure 11:
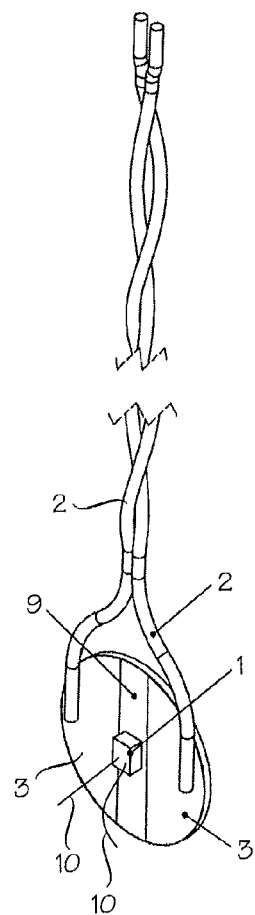
FIG. 11 shows an eighth embodiment of the solution of the invention.

FIGS. 9 to 11 show another three variations of an embodiment of the invention. The same reference numerals are used in FIGS. 9 to 11 as in FIGS. 2 to 8 to refer to the corresponding parts.

In the embodiments of FIGS. 9 to 11, the measuring element 1 is arranged on a heat-conductive substrate 9. The means 3 establishing the terminal areas are formed by means of electrically conductive metallization on the surface of the substrate 9. The heat-conductive substrate 9 may be made of any suitable material, such as aluminum nitride (AlN).

In the embodiment of FIG. 9, the measuring element 1 is a resistance pattern metallized on the substrate 9.

In the embodiment of FIG. 10, the measuring element 1 is soldered on the substrate 9.

The embodiment of FIG. 11 corresponds to that of FIG. 10 in the fastening of the measuring element 1. In the embodiment of FIG. 11, the measuring element 1 is connected to the terminal areas by means of binders 10.

In the embodiment of FIG. 10, the measuring element 1 is connected to the terminal areas by means of conductors 11. In the embodiment of FIG. 9, the measuring element 1 is connected to the terminal areas by surface mounting 12.

The embodiments of FIGS. 9 to 11 may be used in the embodiment of FIG. 4, for example.

The above working examples are not intended to limit the invention in any way, but the structure of the invention and its details may be varied entirely freely within the scope of the claims.

The invention claimed is:

1. A method for measuring temperature, the method comprising:
    arranging a measuring element of a measuring sensor into thermal contact with a process liquid to be measured by means of a separate structure arranged in contact with the process liquid to be measured, wherein the measuring element is on a surface of the separate structure;
    directing a measuring signal received from the measuring element onward by means of measuring conductors connected to the measuring element, wherein, close to and not in physical contact with the measuring element on the surface of the separate structure are terminal areas which are arranged into unrestricted thermal contact with the process liquid being measured, and the measuring conductors are connected to the measuring element through the terminal areas; and
    maintaining the terminal areas essentially at a temperature of the process liquid being measured.

2. A method as claimed in claim 1, comprising:
    providing surface areas of the terminal areas, which are larger than a surface area of the measuring element.

3. A method as claimed in claim 1, wherein the separate structure is a window arranged into contact with the process liquid.

4. A method as claimed in claim 3, wherein the window is made of mineral or plastic material.

5. A method as claimed in claim 1, comprising:
    extending the separate structure into the process liquid with a framework.

6. A method as claimed in claim 5, comprising:
    arranging the measuring element and the terminal areas at a bottom of the framework.

7. A method as claimed in claim 5, comprising:
arranging the measuring element inside a pipe-like framework; and
forming the terminal areas by a flex conductor that is arranged on an inner surface of the pipe-like framework.

8. A method as claimed in claim 1, comprising:
arranging the measuring element on a heat-conductive substrate; and
forming the terminal areas by means of electrically conductive metallization on the surface of the substrate.

9. A method as claimed in claim 1, wherein measuring element is a platinum resistor.

10. A measuring sensor for measuring temperature, the sensor comprising:
a measuring element arranged into thermal contact with a process liquid being measured by means of a separate structure arranged in contact with the process liquid to be measured, wherein the measuring element is on a surface of the separate structure;
measuring conductors connected to the measuring element for directing a measuring signal onward; and
terminal areas close to and not in physical contact with the measuring element on the surface of the separate structure, the terminal areas being in unrestricted thermal contact with the process liquid being measured during measurement, the measuring conductors being connected to the measuring element through the terminal areas, wherein the terminal areas are intended to be essentially at a temperature of the process liquid being measured.

11. A sensor as claimed in claim 10, wherein surface areas of the terminal areas are made larger than surface areas of the measuring element.

12. A sensor as claimed in claim 10, wherein the separate structure is a window arranged into contact with the process liquid.

13. A sensor as claimed in claim 12, wherein the window is made of mineral or plastic material.

14. A sensor as claimed in claim 10, wherein the separate structure is a framework extending to the process liquid.

15. A sensor as claimed in claim 14, wherein the measuring element and the terminal areas are arranged at a bottom of the framework.

16. A sensor as claimed in claim 14, wherein the measuring element is arranged inside a pipe-like framework, and the terminal areas are formed by a flex conductor that is arranged on an inner surface of the pipe-like framework.

17. A sensor as claimed in claim 10, wherein the measuring element is arranged on a heat-conductive substrate, and the terminal areas are formed by means of electrically conductive metallization on the surface the substrate.

18. A sensor as claimed in claim 10, wherein measuring element is a platinum resistor.

19. A method for measuring temperature, the method comprising:
arranging a measuring element of a measuring sensor into thermal contact with a process liquid to be measured by means of a separate structure arranged in contact with the process liquid to be measured, wherein the measuring element is on a surface of the separate structure;
directing a measuring signal received from the measuring element onward by means of measuring conductors connected to the measuring element, wherein, not in physical contact with the measuring element on the surface of the separate structure are terminal areas which are arranged into unrestricted thermal contact with the process liquid being measured, and the measuring conductors are connected to the measuring element through the terminal areas; and
maintaining the terminal areas essentially at a temperature of the process liquid being measured.

20. A measuring sensor for measuring temperature, the sensor comprising:
a measuring element arranged into thermal contact with a process liquid being measured by means of a separate structure arranged in contact with the process liquid to be measured, wherein the measuring element is on a surface of the separate structure;
measuring conductors connected to the measuring element for directing a measuring signal onward; and
terminal areas arranged on the surface of the separate structure, wherein the terminal areas are not in physical contact with the measuring element, and the terminal areas being in unrestricted thermal contact with the process liquid being measured during measurement, the measuring conductors being connected to the measuring element through the terminal areas, wherein the terminal areas are intended to be essentially at a temperature of the process liquid being measured.

* * * * *